US006976394B2

(12) United States Patent
Kleinen et al.

(10) Patent No.: US 6,976,394 B2
(45) Date of Patent: Dec. 20, 2005

(54) LEVEL TRANSMITTER

(75) Inventors: Alfred Kleinen, Wassenberg (DE); Frank Buerger, Dueren (DE); Norbert Ludwig, Brueggen (DE)

(73) Assignee: TI Automotive (Neuss) GmbH, Neuss (DE)

( * ) Notice: Subject to any disclaimer, the term of this patent is extended or adjusted under 35 U.S.C. 154(b) by 39 days.

(21) Appl. No.: 10/606,368

(22) Filed: Jun. 25, 2003

(65) Prior Publication Data

US 2004/0226365 A1 Nov. 18, 2004

(30) Foreign Application Priority Data

Jun. 28, 2002 (DE) ................................ 102 29 280

(51) Int. Cl.[7] ........................ G01F 23/30; G01F 23/32; G01F 23/36; G01B 7/30; G01B 7/14

(52) U.S. Cl. ............................ 73/313; 73/314; 73/317; 324/207.2; 116/227

(58) Field of Search .......................... 73/313, 314, 317, 73/305, 315, 322.5; 340/623, 625; 324/207.2; 116/227

(56) References Cited

U.S. PATENT DOCUMENTS

| | | | | |
|---|---|---|---|---|
| 6,578,417 | B1 * | 6/2003 | Eck | 73/305 |
| 6,762,679 | B1 * | 7/2004 | Diaz | 340/524 |
| 2002/0088278 | A1 * | 7/2002 | Ross, Jr. | 73/290 R |

FOREIGN PATENT DOCUMENTS

| | | | |
|---|---|---|---|
| DE | 19944330 | 3/2001 | |
| JP | 2001124616 A * | 5/2001 | G01F 23/38 |

* cited by examiner

*Primary Examiner*—Hezron Williams
*Assistant Examiner*—Tamiko Bellamy
(74) *Attorney, Agent, or Firm*—Ohlandt, Greeley, Ruggiero & Perle, L.L.C.

(57) ABSTRACT

A level transmitter for liquid containers, particularly fuel store tanks, comprising a housing in which a contactless sensor is arranged which is connected with an evaluating unit and operatively connected with a magnet that moves relative to the sensor when a float arranged at a first end of a lever moves so that the change of the magnetic field acting upon the sensor is transformed into an electric signal so that an output signal corresponding to the level of the liquid in the container is obtainable by the evaluating means. The magnet is configured at least as a segment of an annular magnet that is arranged at a second end of the lever and integrated therein.

7 Claims, 2 Drawing Sheets

LEVEL TRANSMITTER

BACKGROUND OF THE INVENTION

1. Field of the Invention

The invention relates to a contactless level transmitter for liquid containers, particularly fuel store tanks with a housing in which a contactless sensor is arranged which is connected with an evaluating unit and operatively connected with a magnet moving relative to the sensor upon movement of a float arranged at a first end of a lever so that the change of the magnetic field acting upon the sensor is transformed into an electric signal so that an output signal corresponding to the level of the liquid in the tank is obtainable by the evaluating unit.

2. Description of Related Art

Such contactless level transmitters are known and described, for example, in German Patent DE 199 44 330. The level sensor illustrated therein is inserted into an opening at the upper side of a fuel tank. It consists of a lever at the first end of which a float is arranged and the second end of which is borne in a carrier portion, this second end being further connected firmly with a cam. Upon movement of the float, this cam directly or indirectly lifts and lowers a magnet, respectively. This magnet is operatively connected with a contactless sensor so that the magnetic field acting upon the magnet sensor changes upon displacement of the magnet. Of the magnetic field acting upon the magnetic sensor, an electric output signal is produced at the sensor the magnitude of which represents a measure for the level of the liquid in the tank.

A disadvantage of this invention is the relatively complicated and hence cost-intensive structure, which makes the mounting very troublesome. Furthermore, possible sources of fault are created by the complex mechanical construction.

SUMMARY OF THE INVENTION

It is the object of the invention to provide a contactless level transmitter which can be produced and mounted easily, thus minimizes the costs and simultaneously avoids possible sources of fault and thus guarantees functional reliability.

This object is solved by the magnet being configured at least as a segment of an annular magnet arranged at a second end of the lever and integrated therein. Thereby, the number of components is reduced and considerably less mounting efforts are required.

In a further embodiment, at least the segment of the annular magnet is injected into a fuel-resisting plastic of the lever whereby the functional reliability of the magnet in the corrosive fuel is guaranteed.

In a preferred embodiment, this lever arm is rotatably connected with the housing and supported thereat, preferably in clipping or locking engagement. Thereby, the lever arm is mounted and supported at the housing in a very simple manner and a guiding of the annular magnet segment past the sensor is ensured in a simple manner so that a transmission of the float position is effected from the magnet to the sensor without any components being interposed whereby the functional reliability is additionally increased.

As a sensor, a freely programmable sensor is preferably used whereby the adaptation to any form of fuel tank is possible.

In a further embodiment, the sensor, together with suppressor modules, is arranged on a printed circuit board having a fuel-resisting plastic material injected around and being integrated into the housing. This measure also increases the functional reliability since a contact of the printed circuit board with the corrosive fuel is prevented. By integrating the component formed in this manner into the housing, the number of components and the resulting costs are reduced once more.

Optimally, the printed circuit board with the plastic material injected around is adapted to be mounted to the housing via a snap connection and at the same time, the sensor is adapted to be led through an opening in the housing, whereby the total number of components and thus the mounting efforts are reduced once more and a trouble-free operative connection of magnet and sensor is guaranteed since there are no field-influencing components between sensor and magnet.

Substantially, such a level transmitter consists of three components, namely the float, the lever arm with the magnet injected therein and the housing with the integrated sensor. Due to this very small number of components, the mounting efforts are considerably reduced and thus, production costs are saved. Furthermore, the above-described embodiments guarantee and—compared with others—increase the functional reliability of this contactless level transmitter.

BRIEF DESCRIPTION OF THE DRAWINGS

In the drawings, an embodiment according to the invention is illustrated and will be described hereinafter.

DETAILED DESCRIPTION OF A PREFERRED EMBODIMENT

Figure 1:
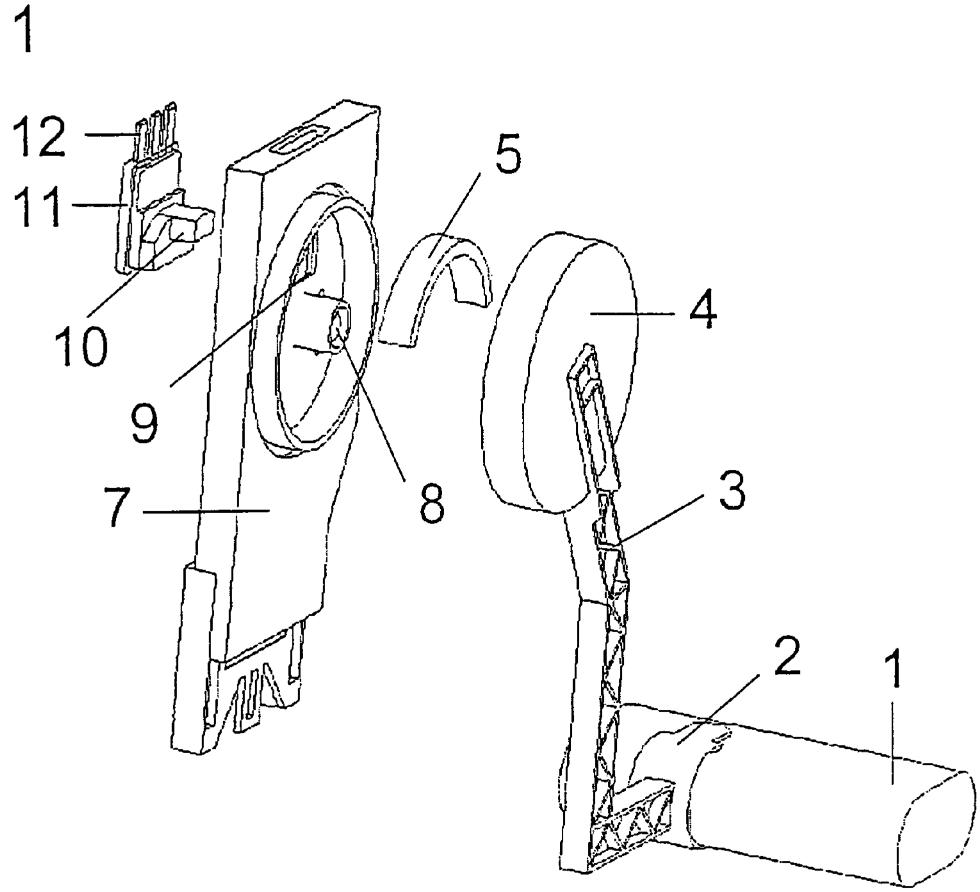
FIG. 1 is a perspective exploded view of a level transmitter according to the invention.
Figure 2:
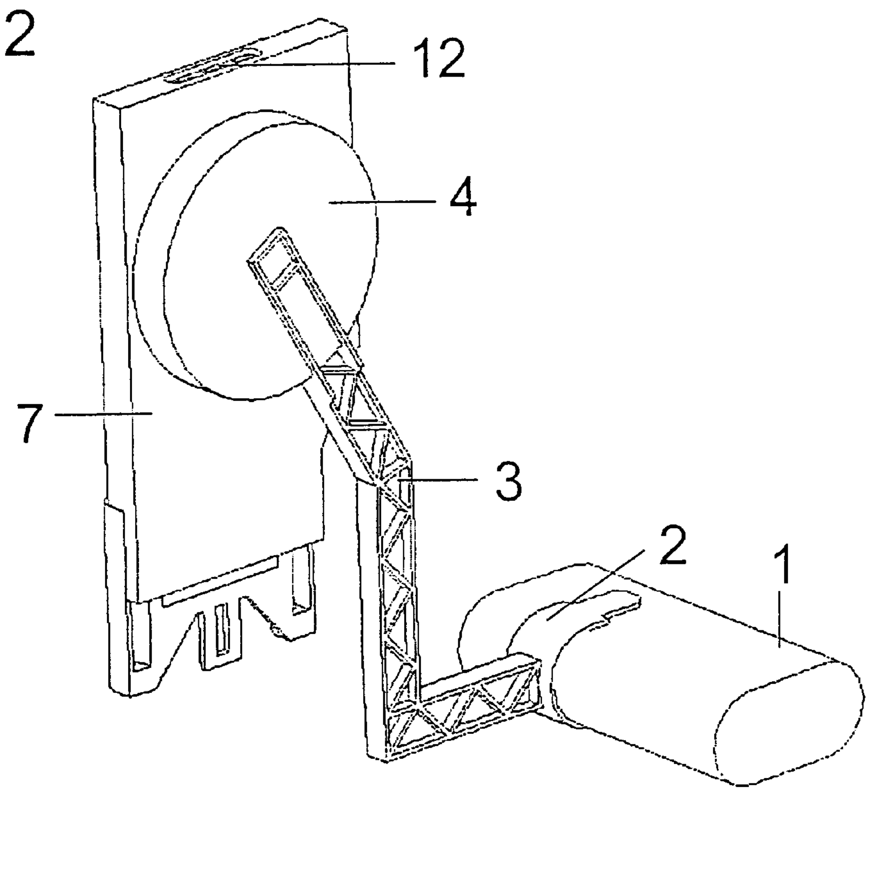
FIG. 2 is a perspective view of the level transmitter according to the invention in the assembled state.
Figure 3:
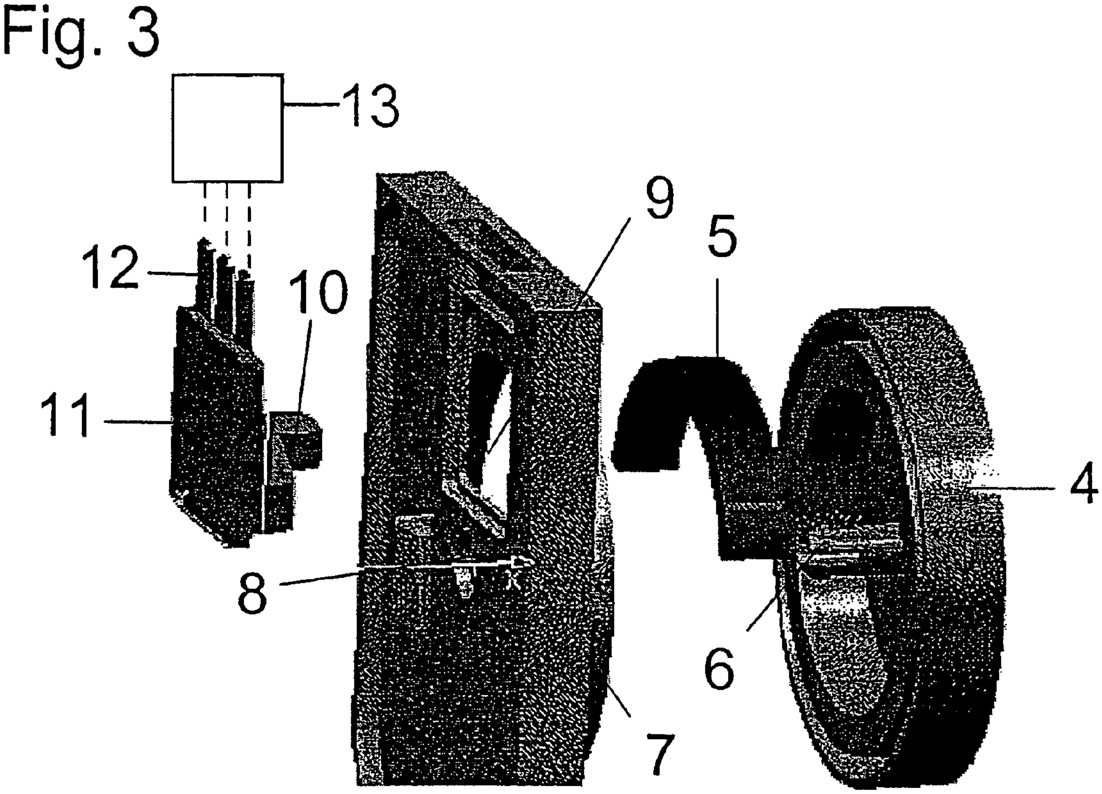
FIG. 3 is an altered perspective exploded view of a detail of the level transmitter according to the invention.
Figure 4:
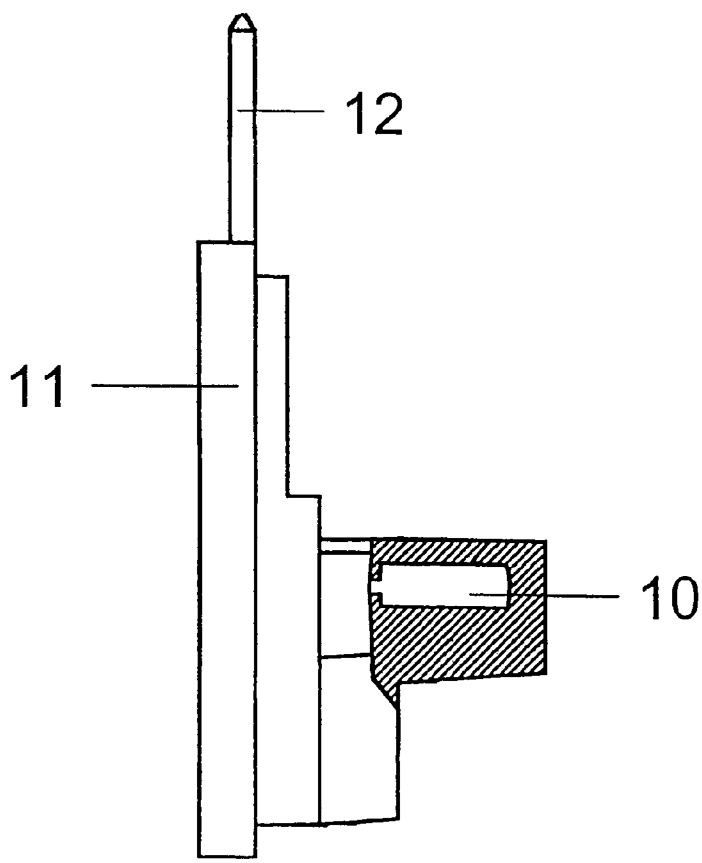
FIG. 4 is a sectional side view of the printed circuit board with the sensor with the material injected around.

A level transmitter illustrated in FIGS. 1–3 consists of a float 1 the specific density of which is lower than that of the fuel in the fuel store tank so that it floats on the surface of the fuel. Via a tongs-shaped end piece 2 of a lever 3, the float 1 is connected with the lever 3. At its second end, the lever 3 comprises a substantially flat cylindrical enlargement 4, the lever radially pointing to a central axis of the cylindrical enlargement 4. Into the enlargement 4, a semicircular segment of an annular magnet 5 is injected. In a further embodiment, at least the segment of the annular magnet 5 is injected into a fuel-resisting plastic of the lever 3 whereby the functional reliability of the magnet 5 in the corrosive fuel is guaranteed. The manufacture of the lever 3 with its tongs-shaped end piece 2 and its flat cylindrical enlargement 4 as well as the injection of the segment of the annular magnet 5 is effected in one process step in the injection molding process. The lever 3 has a substantially grid-like structure having a high strength despite the small volume of the required material. On the central axis of the flat cylindrical enlargement 4, there is a pin-shaped projection 6 via which the lever is rotatably supported in a housing 7. At the same time, a clip connection is created between the bore 8 of the housing 7 and the pin-shaped projection 6 so that the lever 3 cannot disengage from the housing 7 by itself. In the region where the flat cylindrical enlargement 4 of the lever 3 is arranged in the assembled state, the housing 7 furthermore has an opening 9 through which a Hall sensor 10 arranged on a printed circuit board 11 is pushed. The Hall sensor 10 is preferably a freely programmable sensor, whereby adaptation to any form of fuel tank is possible. This printed circuit board 11 accommodating the Hall sensor 10 and non-illustrated suppressor components is pushed to the housing from the opposite side and brought into locking or clipping engagement therewith so that in the assembled state, the Hall sensor 10 reaches into that part of the flat cylindrical enlargement 4 which is hollow cylindrical from this side. Thereby, an optimum communication between the annular magnet 5 and the Hall sensor 10 is guaranteed. Before the printed circuit board 11 is attached to the housing 7, a fuel-resisting plastic material is injected around the printed circuit board 11 with the suppressor components and the Hall sensor 10. The position of the Hall sensor 10 on the printed circuit board 11 and the shape of the emerging component can be seen in FIG. 4.

If the fill of the fuel tank changes, the lever 3 is turned by the float 1. Simultaneously, the flat cylindrical enlargement 4 rotates about the pin-shaped projection 6 supported in the housing 7 together with the annular magnet 5. Thereby, the magnetic field of the annular magnet 5 acting upon the Hall sensor 10 is changed so that another electric signal is transferred from the printed circuit board 11 via contacts 12 to the evaluating unit 13. In case of an appropriate programming, it is thus possible to allocate a float position and thus a level of the liquid in the tank to each rotational angle of the annular magnet and output signal resulting therefrom.

With the embodiment according to the invention, a structure is provided which considerably reduces the number of components and thus the mounting efforts due to its simple modular construction and guarantees a high functionality at the same time. Because of this compact construction with few components, the costs arising can thus be minimized. Modifications with respect to the configuration of the individual components and here particularly the choice of the elements connecting the individual parts with each other have no effect upon the scope of protection of the invention.

What is claimed is:

1. A level transmitter for liquid containers, particular fuel store tanks, comprising:

a housing in which is arranged a contactless sensor connected to an evaluating unit and operatively connected to a magnet that moves relative to the sensor upon movement of a float arranged at a first end of a lever, so that the change of the magnetic field acting upon the sensor is transformed into an electric signal so that an output signal corresponding to the level of the liquid in the container is obtainable by the evaluating means, wherein the magnet is at least one segment of an annular magnet that is arranged at a second end of the lever and integrated therein, wherein the lever is rotatably connected with the housing and supported thereat, and wherein the sensor is located on a radial axis of the at least one segment of the annular magnet.

2. The contactless level transmitter of claim 1, wherein the at least one segment of the annular magnet is adapted to be injected into a fuel-resisting plastic material of the lever.

3. The contactless level transmitter of claim 1, wherein the sensor is freely programmable.

4. The contactless level transmitter of claim 1, wherein the sensor is arranged on a printed circuit board together with suppressor modules, and wherein the printed circuit board has a fuel-resisting plastic material injected around and is integrated into the housing.

5. The contactless level transmitter of claim 1, wherein the printed circuit board having the plastic material injected around is adapted to be mounted to the housing via a snap connection and the sensor is adapted to be led through an opening in the housing at the same time.

6. The contactless level transmitter of claim 1, wherein the lever is rotatably connected with the housing and supported thereat by means of either a clipping or locking engagement.

7. The contactless level transmitter of claim 1, wherein the sensor is located between an axis of rotation of the lever and the at least one segment of the annular magnet.

* * * * *